United States Patent [19]

Muller

[11] Patent Number: 4,658,945
[45] Date of Patent: Apr. 21, 1987

[54] FRICTION CLUTCH RELEASE MECHANISM

[75] Inventor: Patrick Muller, Sevran, France

[73] Assignee: Automotive Products plc, Leamington Spa, England

[21] Appl. No.: 730,749

[22] Filed: May 6, 1985

[30] Foreign Application Priority Data

May 7, 1984 [FR] France ................................ 8407061
Dec. 18, 1984 [FR] France ................................ 8419370

[51] Int. Cl.⁴ ........................................... F16D 23/14
[52] U.S. Cl. ............................... 192/89 B; 192/70.13; 192/98; 192/110 B
[58] Field of Search ................... 192/89 B, 98, 110 B, 192/70.13, DIG. 1

[56] References Cited

U.S. PATENT DOCUMENTS

| | | | |
|---|---|---|---|
| 4,228,882 | 10/1980 | Huber et al. | 192/98 |
| 4,399,898 | 8/1983 | Olschewski et al. | 192/98 |
| 4,456,111 | 6/1984 | Limbacher | 192/98 X |
| 4,502,583 | 3/1985 | Limbacher | 192/98 |
| 4,529,076 | 7/1985 | Renaud | 192/98 |
| 4,560,053 | 12/1985 | Lassiaz | 192/98 |
| 4,565,271 | 1/1986 | Lassiaz | 192/89 B |
| 4,588,061 | 5/1986 | Mallet | 192/98 |

FOREIGN PATENT DOCUMENTS

| | | | |
|---|---|---|---|
| 2613952 | 10/1977 | Fed. Rep. of Germany | 192/98 |
| 2639766 | 3/1978 | Fed. Rep. of Germany | |
| 2304826 | 10/1976 | France | |
| 2539473 | 7/1984 | France | |

Primary Examiner—Rodney H. Bonck
Assistant Examiner—Richard M. Lorence
Attorney, Agent, or Firm—Solon B. Kemon

[57] ABSTRACT

A release mechanism for use with a clutch release bearing of a pull type clutch comprises an element on which there is a transverse circular groove, and locking members comprising a flexible ring coaxial with a diaphragm and bearing on the circumference of a central aperture therein, and a washer with flexible lugs applied against the face of the diaphragm and coaxial with this latter so that the flexible lugs engage around the ring to render it rigid with the diaphragm. The ring is adapted to snap into the groove in the actuating element at the moment of engagement.

13 Claims, 22 Drawing Figures

FRICTION CLUTCH RELEASE MECHANISM

The present invention relates to a release mechanism for use with a clutch release bearing of a pull-type friction type clutch.

As is well known, a friction clutch is essentially composed to two parts. The clutch proper, the member which transmits the rotary movement from a drive means to a driven means, for example the input shaft of a gearbox, is mounted on the engine flywheel and thus forms a first part. The second part comprises a clutch release bearing (for clutch engagement or disengagement) which is mounted to slide on a sleeve of a housing of the gearbox, traversed by the output shaft thereof.

The clutch release bearing is connected to a clutch throw-out fork rigid with the housing of the gearbox, so that it can be pulled in a direction which brings it close to the gearbox. Furthermore, during the course of assembly, the two parts are brought together and interlocked, the clutch release bearing having to be connected to a diaphragm situated in the opposite part in order to transmit the pulling movement induced by the clutch throw-out fork. This means that this phase of assembly is tricky because it is often difficult to connect the clutch release bearing to the diaphragm, the clutch housing being close to the engine so that it can be fixed thereto.

In order to resolve this assembly problem, a device has been proposed for clip-on mounting, employing a flexible ring mounted on the clutch release bearing or on a ring rigid with the diaphragm, the flexible ring being intended to penetrate into a groove provided on the other part for the purpose. Engagement is then carried out by displacing the clutch release bearing by means of the clutch throw-out fork for elastic engagement of the ring into the receiving groove after having placed the clutch housing in position on the engine casing.

A known construction comprises an engaging ring inserted into a groove and locked therein by means of two coaxial washers. Such a construction has the drawback of requiring multiple components and an interlocking ring which is difficult to machine, the assembly of this arrangement being furthermore not very easy and manufacture being relatively complicated.

Finally, in some cases, when the space available between the clutch cover and the housing of the gearbox is small, dismantling of the gearbox by rotation of the fork on its axis is difficult and in some cases even impossible.

The present invention sets out to remedy these drawbacks by proposing a mechanism for engaging a clutch release bearing by simple snap-on fitment, which is easy to implement and not expensive. Another object of the invention is to permit of easy and rapid dismantling of the clutch release bearing regardless of the accessibility afforded by the shape fo the gearbox.

The mechanism for engaging the clutch release bearing which operates on the pull principle and which is the subject of the invention comprises on the one hand a clutch release bearing mounted to slide on a sleeve of the housing of a gearbox, comprising at its end which is towards the clutch an actuating element formed by a ring in which there is a transverse circular groove, and on the other a diaphragm provided with means of interlocking this latter with the clutch release bearing.

According to the invention, this mechanism is characterised in that the said locking means comprise a flexible ring coaxial with the diaphragm and bearing on the circumference of a central aperture bearing, and a washer provided with flexible lugs and applied against the face of the diaphragm opposite the clutch and coaxially with this latter so that the flexible lugs engage around the flexible ring to render it rigid with the diaphragm, the ring being adapted to snap into the groove in the actuating element at the moment of engagement.

Therefore, the number of components involved in engagement is small.

Furthermore, these components are of simple design which makes it possible to produce an engaging mechanism which is easy to operate and which is not expensive.

According to further characteristic features of the invention:
- the flexible ring is a ring bearing on a support ring, the latter being applied to a face of the diagraphm which is opposite that on which the washer bears;
- a frustoconical drive bearing surface of the diaphragm is formed on an edge of the groove, the flexible ring bearing on this bearing surface when the clutch release bearing exerts pull in the direction of clutch disengagement.

Further characteristic features and advantages of the present invention will become evident from the ensuing description of three embodiments thereof, indicated solely by way of non-limitative example, reference being made to the appended drawings, in which.

Figures 16, 17:
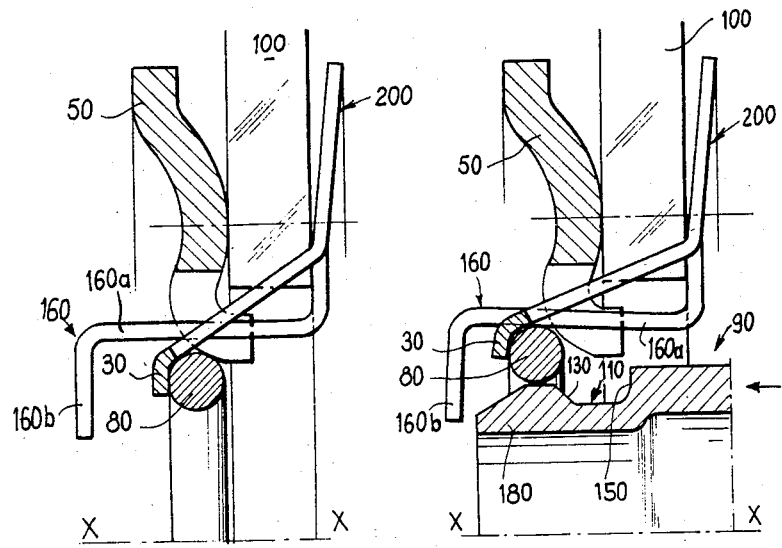
Figure 18:
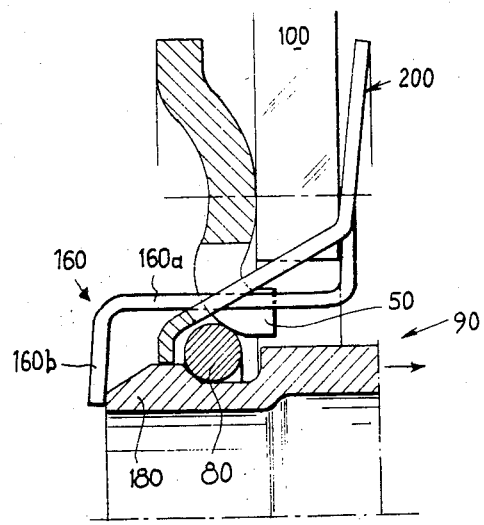

FIGS. 16 and 17 are partial cross-sectional views through the engaging mechanism according to the addition, prior to, during and after engagement respectively; and FIGS. 19 to 22 are partial cross-sectional views similar to those in FIGS. 16 to 18 showing the successive positions occupied by the flexible lugs of the washer at the start of disengagement, during disengagement and after disengagement of the clutch release bearing.

Referring to FIGS. 1 to 6, a mechanism can be seen in these drawings for engaging the clutch release bearing, which comprises on the one hand a clutch release bearing 17 mounted to slide on a sleeve 14 of the housing of a gearbox (not shown) provided at its end which is towards the clutch (not shown) with an actuating element 9. This latter consists of a ring in which there is transversely provided a circular groove 10 situated at the rear of a cylindrical guide bearing surface 12 adjacent to a frustoconical engaging bearing surface 11 formed in front of the actuating element 9. The groove 10 is bounded on the same side as the guide bearing surface 12 by a frustoconical drive bearing surface 13 and on the opposite side by a flat radial surface 15.

The clutch comprises a diaphragm 1 having a central aperture 16 on which is applied coaxially with this latter locking means comprising a bearing ring 5 carrying a flexible ring 8 and a washer 2 provided with flexible lugs 3. At their ends, these latter are provided with a pair of lateral spurs 21, the function of which will be explained hereinafter during description of the way the mechanism is dismantled. The washer 2 is applied coaxially on the opposite face of the diaphragm 1 so that the flexible lugs 3 engage around the ring 8 passing between blades 4 of the diaphragm 1 and through notches 6 in the bearing ring 5. This latter is so formed that its inner circumference has a bearing surface 7 directed towards the central aperture 16 in the diaphragm 1 to allow the ring 8 to be applied against this bearing surface. The ring 5 furthermore has an incurvate shape at the level of its part which bears on the diaphragm 1 in order to facilitate pivoting of this latter during displacement of the clutch release bearing 17.

The manner of operating the mechanism for clutch engagement described hereinabove is particularly simple.

First of all (FIG. 2), the actuating element 9 placed coaxially with the diaphragm 1 is engaged into the circular central aperture 16 (arrow A) and resiliently moves the ring 8 aside by the fact that the latter slides on its frustoconical engaging surface 11 provided at its free end. In the second phase (FIG. 3), introduction of the actuating element 9 into the diaphragm 1 continuing, the ring 8 is applied resiliently on the guide bearing surface 12 while the lugs 3 move aside.

Engagement is carried out (FIG. 4) by continuing to push the actuating element 9. The ring 8 then penetrates the groove 10 in which it snaps elastically, sliding over the frustoconical bearing surface 13. This positioning is facilitated by the lugs 3 which, previously constrained, resume a position of equilibrium as they apply themselves with frictional contact to the cylindrical guide bearing surface 12.

Upon actuation of the clutch throw-out fork, the actuating element 9 is pulled in the direction opposite the arrow A, the effect of this being to apply the ring 8 onto the frustoconical drive bearing surface 13.

The advantages of the mechanism according to the invention derive particularly from the flexible lugs 3, the number of which may vary. These lugs 3 maintain the ring 8 and the bearing ring 5 against the diaphragm 1, retaining the ring 8 during assembly of the mechanism.

Furthermore, they have the advantage of rotationally interlocking the diaphragm 1, the bearing ring 5, the ring 8 and the actuating element 9. Indeed, the lugs 3 pass on the one hand between the blades 4 of the diaphragm 1 and, on the other, are inserted into notches 6 in the bearing ring 5 so that they co-operate by frictional contact with the guide bearing surface 12 of the actuating element 9, thus eliminating any vibration at engagement level.

The components of the mechanism according to the invention are of simple design and can be made from current and inexpensive materials such as hard steel spring wire for the ring 8, of carbonitride mild steel for the bearing ring 5 and treated spring steel for the washer 2.

Figure 1:
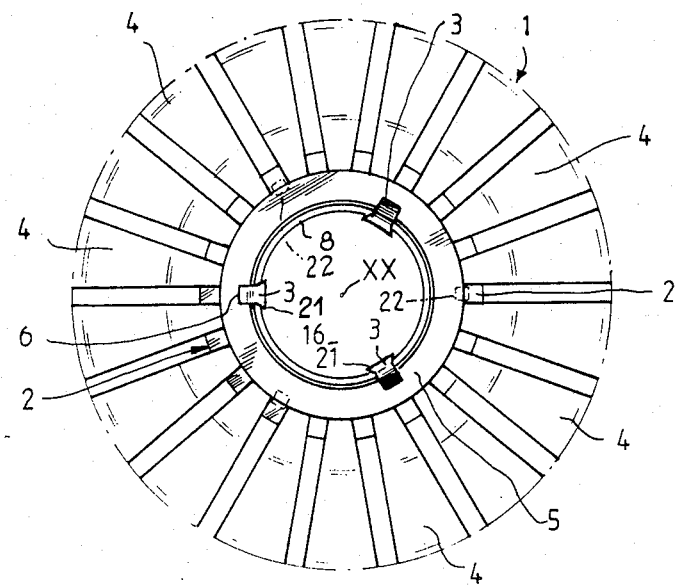
FIG. 1 is a partial elevation showing the engaging mechanism according to an embodiment of the invention.
Figure 6:
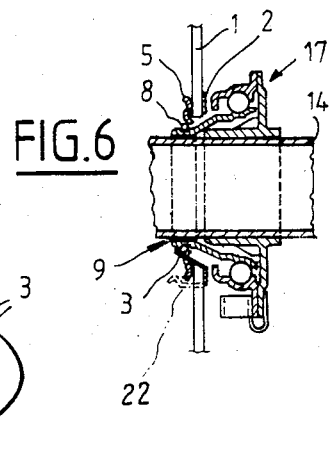
FIG. 6 is a partial cross-sectional view on a reduced scale in relation to FIGS. 2 to 4 through the engaging mechanism and the clutch release bearing.
Figure 5:
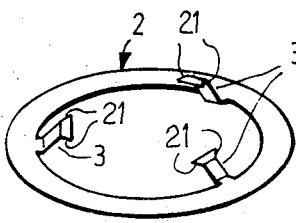
FIG. 5 is a perspective view of a washer with flexible lugs forming part of the engaging mechanism shown in the preceding drawings.
Figure 4:
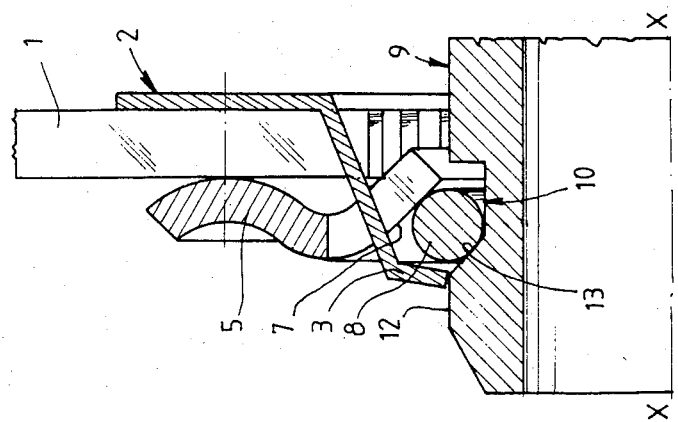
FIG. 4 is a partial cross-sectional view taken on the line X—X in FIG. 1 through the engaged mechanism.
Figure 3:
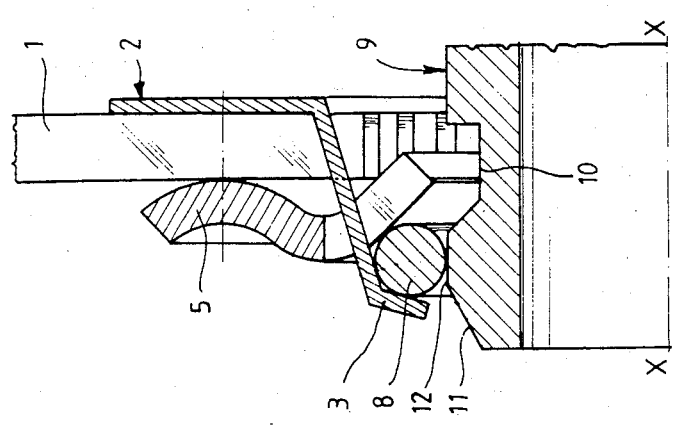
FIG. 3 is a partial cross-sectional view taken on the line X—X in FIG. 1 through the mechanism during the course of engagement.
Figure 2:
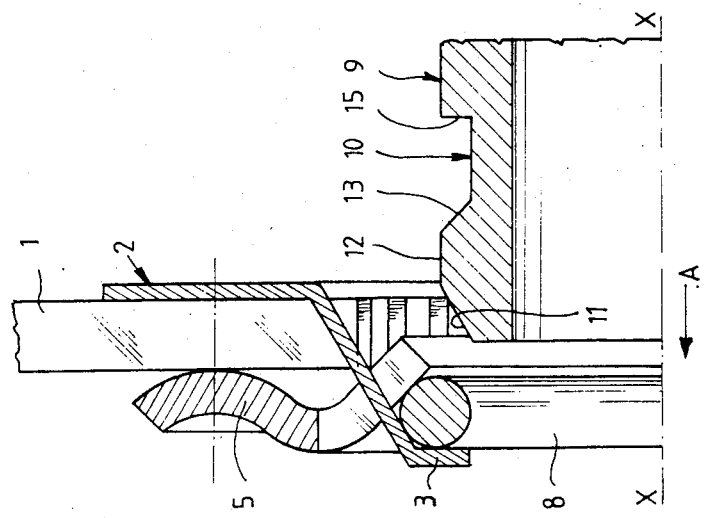
FIG. 2 is a partial cross-sectional view taken on the line X—X in FIG. 1 through the mechanism according to the invention prior to engagement.

In that alternative embodiment of the mechanism which is illustrated in FIGS. 7 to 10, the lugs 3a of the washer 2a are at rest (FIG. 7), slightly inclined on a plane at a right-angle to the axis XX of the actuating element 9 and in the direction of clutch engagement (whereas in the embodiment shown in FIG. 2, the lugs 3 are in a plane at a right-angle to the axis XX). The lugs 3a, like the lugs 3, are provided with terminal spurs 21 (not shown in FIGS. 7 to 10). Furthermore, the groove 10a is slightly wider axially than is the groove 10.

Dismantling of the engaged mechanism is carried out by continuing displacement of the actuating element 9 (FIG. 7) in the direction of the arrow A, the effect of this being to force the lugs 3a to pass resiliently beyond the ring 8 to expand in the groove 10a between this latter and the flat radial surface 15 (FIGS. 8 and 9), the axial width of the groove 10a making it possible for it easily to receive these two components.

Figure 10:
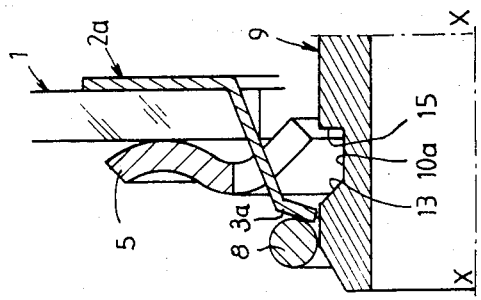
FIGS. 7 to 10 are partial cross-sectional views similar to FIGS. 2 to 4 representing the different stages of dismantling of the clutch release bearing in an embodiment of the mechanism according to the invention.

The inclination of the lugs 3a on the diaphragm 1 makes it possible for them easily to straddle the ring 8 during pushing of the actuating element 9 in the direction of the arrow A. The ring 8 released from the flexible lugs 3 is then extracted from the groove 10a by pulling the actuating element 9 in the direction opposite to the arrow A, the flexible lugs 3a pushing the ring 8 out of the groove 10a in that the ring slides over the frustoconical drive bearing surface 13 (FIG. 10).

Figure 9:
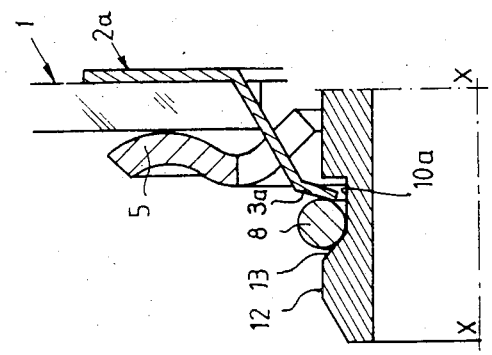
Figure 8:
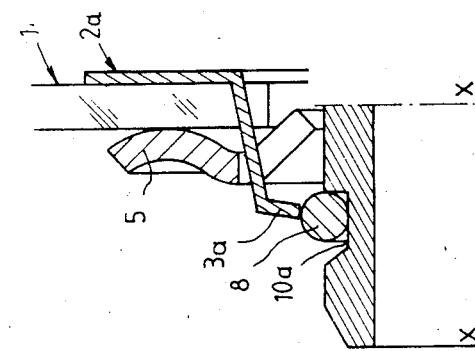
Figure 7:
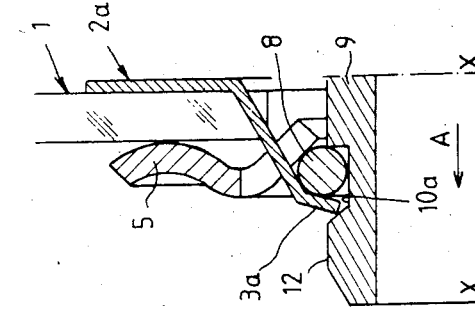

Furthermore, as from the position of the mechanism illustrated in FIG. 9, the spurs 21 prevent the ring 5 from bearing on the ring 8 and thus from constraining this latter in the groove 10a. The ring 5 and more precisely its bearing surface 7 will therefore abut against the spurs 21.

The clutch release bearing 17 may thus be easily separated from the clutch mechanism, which constitutes a considerable advantage of the invention over prior art mechanisms.

Figure 11:
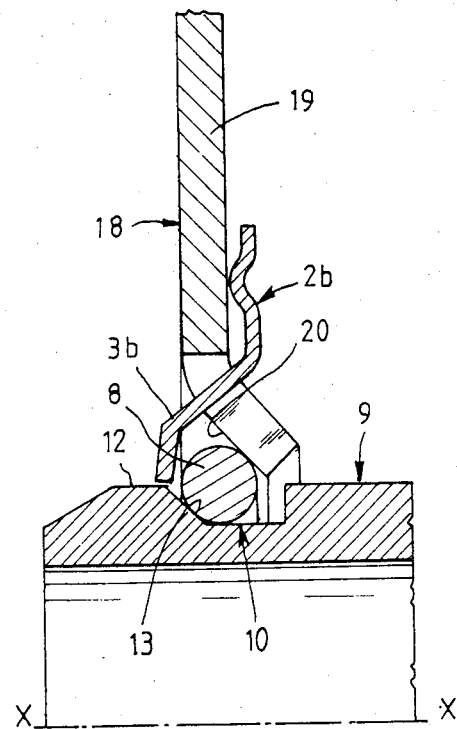
FIG. 11 is a partial cross-sectional view through a third embodiment of the invention.

In a third possible embodiment of the invention (FIG. 11), the bearing ring 5 is dispensed with and the radial blades 19 of the diaphragm 18 are provided with curved terminal parts 20 having an annular bearing surface for the ring 8. In addition, the washer 2b bears on the blades 19 by a circular bead and no longer by a flat surface and it is provided with flexible means, not shown, for retaining it on the diaphragm 18.

In other respects, the manner of operation of the embodiment is the same as that of the embodiments previously described.

In another possible embodiment of the invention, the engaging mechanism may comprise a flexible ring provided with a projection adapted to allow it to bear on the edge of the central orifice 16 of the diaphragm 1. Thus it is possible to eliminate the bearing ring 5 which further simplifies the mechanism according to the invention.

Furthermore, the part of the washer 2 which bears on the diaphragm 1 may have a profile other than flat as shown and may for example be incurvate such as the bearing ring 5. This arrangement facilitates pivoting of the diaphragm 1 upon contact with it.

Finally, the spurs 21 of the lugs 3, 3a may be replaced by flexible tongues 22 (FIGS. 1 and 6) formed on the outer periphery of the washer 2 and disposed in order axially to retain the ring 5 by its outer circumference.

The engaging mechanisms described hereinabove have been found to be satisfactory in use but it is noted that at the moment of disengaging the clutch release bearing and the gearbox, the ring is no longer retained and falls into the clutch engaging mechanism, between the diaphragm and the engine.

It is then necessary to find this ring in the bottom of the clutch mechanism in order to be able to proceed with fresh engagement of the clutch.

In order to remedy this drawback, the invention provides the embodiment of engaging mechanism which is illustrated in FIGS. 14 to 22.

Figure 12:
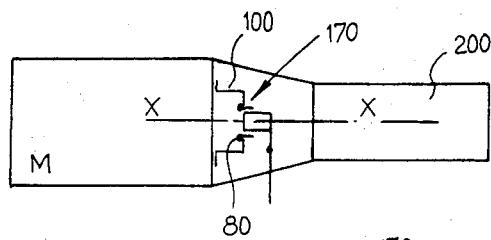
FIG. 12 is a diagram showing the positions of the gearbox, of the clutch release bearing, of the clutch engaging mechanism and of the engine during engagement of the clutch release bearing with the clutch engaging mechanism.
Figure 13:
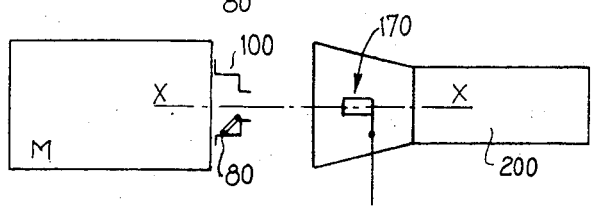
FIG. 13 is a diagram similar to that in FIG. 12 showing the relative positions of these various elements after disengagement of the clutch release bearing and the gearbox.
Figure 14:
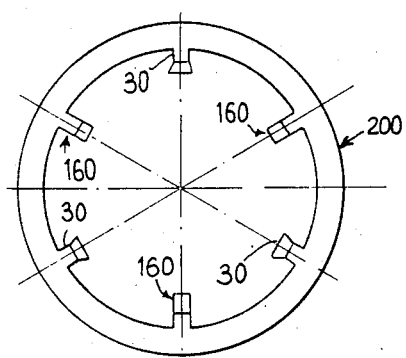
FIG. 14 is a plan view of an alternative embodiment of the washer with flexible lugs according to the invention.
Figure 15:
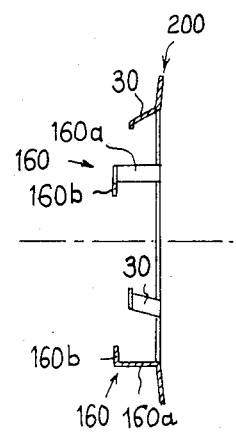
FIG. 15 is a side elevation of the washer in FIG. 14.

If reference is made to FIG. 12, an engine M will be seen to which is fixed the diaphragm 100 of a clutch engaging mechanism, a clutch release bearing 170 acting by traction and mounted to slide on a sleeve (not shown) on the housing of a gearbox 200, the clutch release bearing 170 being coupled to the clutch diaphragm 100.

As previously, the engaging mechanism comprises a ring 80 which falls into the clutch mechanism between the diaphragm 100 and the engine M after disengagement of the clutch release bearing 170 and the gearbox.

In order to avoid this drawback, the invention provides for the washer 2 of the mechanism in FIGS. 1 to 11 to be provided with flexible tongues 160 extending axially through the central aperture in the diaphragm 100 beyond the flexible lugs 30, as seen in FIGS. 16 to 22.

The resilient tongues 160, three in number, distributed at equal angular intervals of 120° around the periphery of the washer 200 between the three flexible lugs 30 each comprise a part 160a extending axially substantially parallel with the axis X—X of the clutch release bearing 170 and its actuating element 90, and a radial terminal part 160b. The length of the axial parts 160a is such that they extend substantially as far as the level of the end of the nose 180 of the actuating element 90 when this latter is engaged with the diaphragm 100 (FIG. 18), the radial parts 160b then being resiliently applied to this end of the nose 180.

The technical action of the flexible tongues 160 is as follows:

Before engagement of the actuating element 90 of the clutch release bearing 170 with the clutch mechanism (FIG. 16), the ring 80 is maintained between the flexible lugs 30 and the bearing ring 50. When the actuating element 90 is caused to slide along the axis X—X in the clutch mechanism (FIG. 17), the nose 180 of this actuating element 90 slides under the ring 80 which it raises together with the flexible lugs 30. Then the ring 80 becomes positioned in the circular groove 110 on the frustoconical bearing surface 130 of which it is maintained in a bearing relationship by the ring 50 (FIG. 18), while the radial end portions 160b of the tongues 160 exert a resilient pressure on the nose 180 of the element 90 of the clutch release bearing 170.

This pressure exerted by the tongues 160 maintains constantly in contact the nose 180, the ring 80 and the bearing ring 50. Thus, the flexible lugs 160 reinforce the contact between the ring 80, the actuating element 90 and the bearing ring 50.

These lugs 160 also have a second function: indeed, upon completion of engagement of the clutch release bearing 170, they oppose a certain resilient resistance to the axial sliding of the actuating element 90. This resistance allows the operator to realise that engagement is completed and consequently avoids the risks of the ring 80 suddenly snapping out of position.

Figure 19:
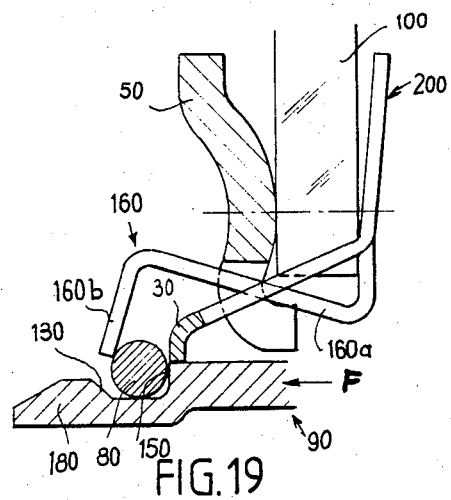
Figure 20:
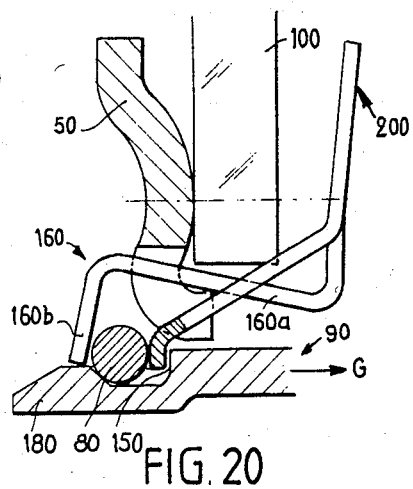
Figure 21:
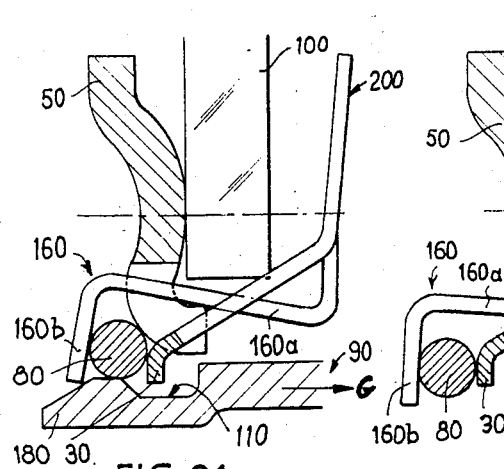
Figure 22:
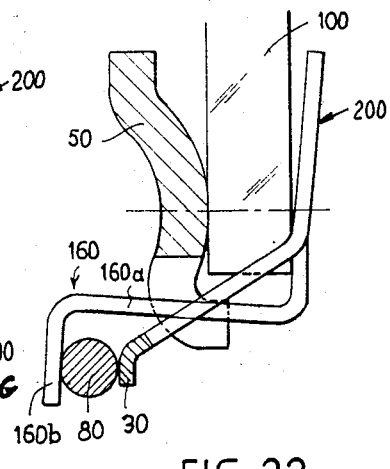

On the other hand, when it is desired to disengage the clutch release bearing 170, this latter is pushed axially towards the engine M, as indicated by the arrow F in FIG. 19. The ring 80 is then displaced in the groove 110 so that it comes to rest on the transverse wall 150 of this latter which is opposite the frustoconical bearing surface 130, while the flexible lugs 30 slide over the ring 80 and the flexible tongues 160 apply their radial ends 160b to the ring 80.

Then the clutch release bearing 170 is caused to slide in the opposite direction in order to disengage it (arrow G in FIG. 20), so that the ring 80 is pushed back against the frustoconical bearing surface 130 by the flexible lugs 30 which become inserted between the transverse wall 150 and the ring 80. Pursuing sliding of the clutch release bearing in the direction of the arrow G (FIG. 21), the lugs 30 extract the ring 80 from the groove 110 by sliding on the bearing surface 130, and the ends 160b of the tongues 160 are applied elastically against the ring 80. Upon completion of disengagement of the clutch release bearing 170 (FIG. 22), the ring 80 is maintained by being flexibly gripped between the ends 160b of the tongues 160 and the lugs 30, so that it cannot any longer fall into the clutch mechanism.

For a fresh engagement of the gearbox 200 on the engine M, it is then sufficient to replace the ring 80 between the tongues 30 and the ring 50 as illustrated in FIG. 16.

Alternatively, it is obvious that the number and arrangement of the flexible tongues 160 may be varied.

I claim:

1. A friction clutch release mechanism for use with a clutch release bearing of a pull-type friction clutch comprising an actuating element formed by a ring in which there is a transverse circular groove, a diaphragm, and locking means for interlocking the diaphragm with the clutch release bearing, said locking means comprising a flexible ring coaxial with the diaphragm and engaging a bearing, and a washer provided with flexible lugs and so positioned that the diaphragm lies between the washer and the clutch whereby the flexible lugs engage around the flexible ring to render it rigid with the diaphragm, the flexible ring being adapted to snap into the groove in the actuating element to effect said interlocking.

2. Mechanism according to claim 1 in which the bearing is so positioned that the diaphragm lies between the bearing and the washer.

3. Mechanism according to claim 1 in which the actuating element has a frustoconical drive bearing surface defined by an edge of the groove, the flexible ring bearing on the bearing surface when a force is exerted in a clutch disengagement direction by the clutch release bearing.

4. Mechanism according to claim 2 in which the bearing flexible locks the ring against the drive bearing surface during pulling of the clutch release bearing.

5. Mechanism according to claim 1 in which the flexible lugs are inserted between radial blades of the diaphragm and bear frictionally on the actuating element so ensuring rotational interlocking of the locking means and the actuating element.

6. Mechanism according to claim 1 in which the flexible lugs traverse notches provided in the inner periphery of the bearing ring.

7. Mechanism according to claim 1 in which the flexible lugs of the washer are at rest slightly inclined to a plane at right-angles to an axis of the actuating element and in a clutch engagement direction and in which the groove is of an appropriate width to facilitate penetration of the flexible lugs into the groove during dismantling of the clutch release bearing by pushing of the clutch release bearing in the direction of clutch engagement and then pulling the clutch release bearing in an opposite direction.

8. Mechanism according to claim 1, in which the diaphragm comprises radial blades defining an aperture through which the actuating element can pass, the radial blades being provided with curved terminal faces providing an annular bearing surface for the flexible ring.

9. Mechanism according to claim 1 in which the lugs of the washer are provided with terminal spurs which prevent the bearing from constraining the flexible ring in its groove during dismantling of the clutch release mechanism.

10. Mechanism according to claim 1 in which flexible tongues are formed on the outer periphery of the washer in order to axially retain the bearing by its outer periphery.

11. Mechanism according to claim 1 in which the washer is provided with flexible tongues extending axially through a central aperture of the diaphragm beyond the flexible lugs and arranged in such a way that, after disengagement of the clutch release bearing in relation to the diaphragm, a flexible pressure is exerted which resilienty maintains the flexible ring applied against the flexible lugs.

12. Mechanism according to claim 11, in which each tongue comprises a part extending axially and a radial terminal part for maintaining the flexible ring on the flexible lugs after disengagement of the clutch release bearing, the length of the axial part being such that the radial part exerts on a nose of the actuating element of the clutch release bearing a force which, during engagement of the clutch release bearing with the clutch mechanism, resilienty holds the nose, the flexible ring and the bearing constantly in contact.

13. Mechanism according to claim 12 in which the tongues are distributed at equal angular intervals over the washer and fit between the flexible lugs.

* * * * *